(No Model.) 4 Sheets—Sheet 1.
J. H. SCHENCK & S. MALTBY.
MACHINERY FOR EXCAVATING AND CONSTRUCTING SEWERS.
No. 247,783. Patented Oct. 4, 1881.
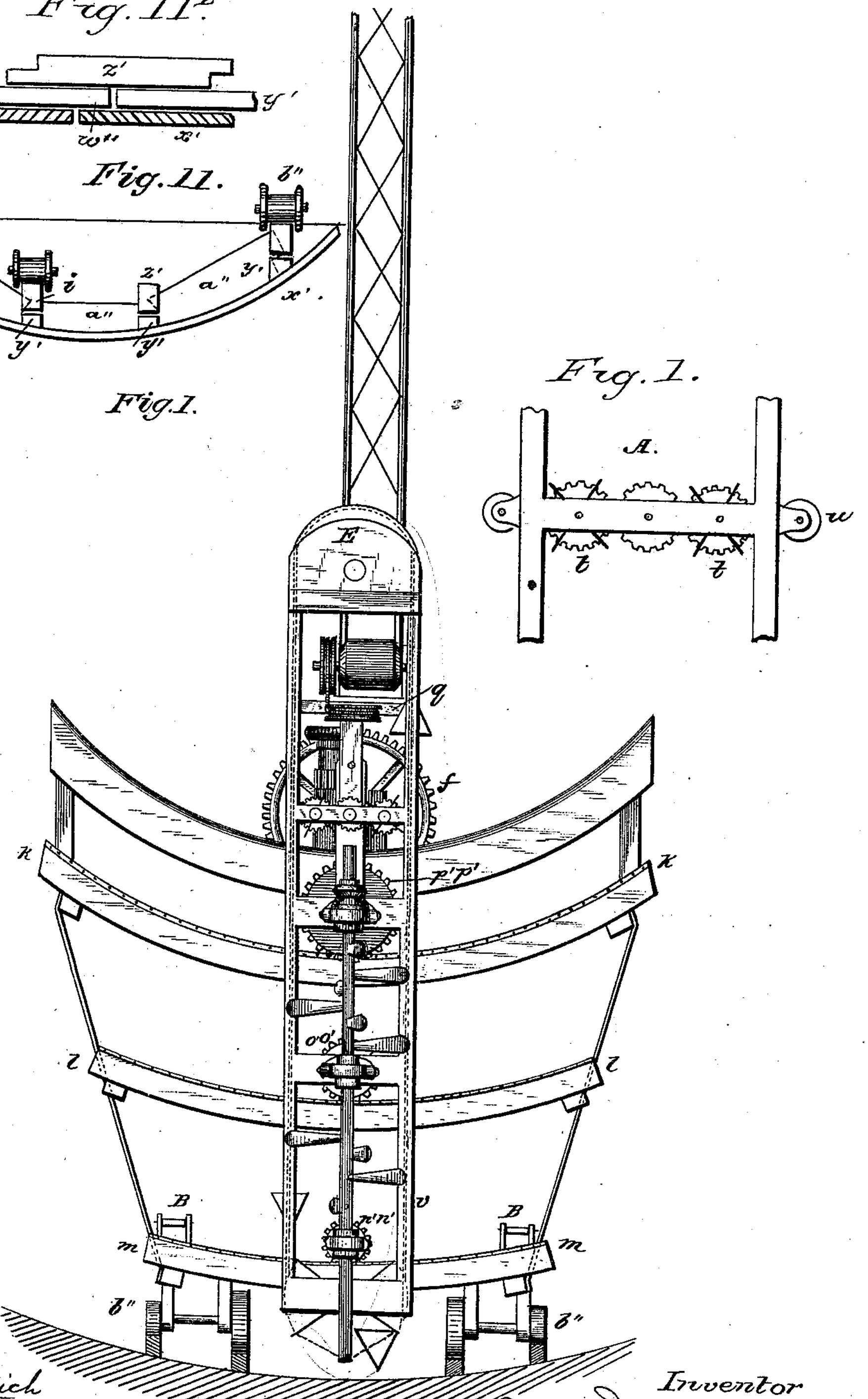
Witnesses
Fred. G. Dieterich
A. H. Krause
Inventor
J. H. Schenck
Sidney Maltby
N. PETERS. Photo-Lithographer, Washington, D. C.

(No Model.)
4 Sheets—Sheet 2
J. H. SCHENCK & S. MALTBY.
MACHINERY FOR EXCAVATING AND CONSTRUCTING SEWERS.
No. 247,783. Patented Oct. 4, 1881.
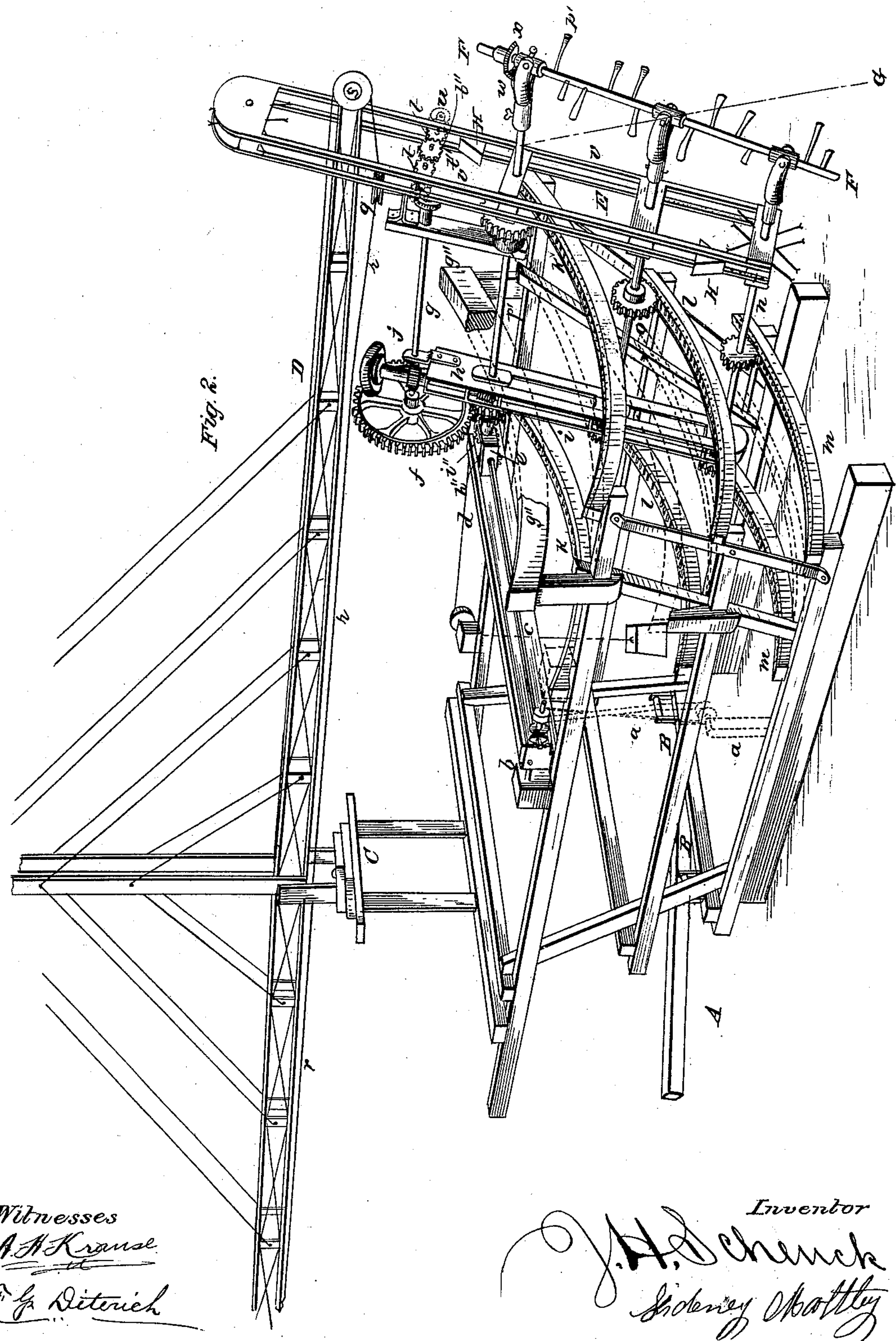
Witnesses
A. H. Krause
F. G. Diterich
Inventor
J. H. Schenck
Sidney Maltby
N. PETERS, Photo-Lithographer, Washington, D. C.

(No. Model.)
4 Sheets—Sheet 3.
J. H. SCHENCK & S. MALTBY.
MACHINERY FOR EXCAVATING AND CONSTRUCTING SEWERS.
No. 247,783. Patented Oct. 4, 1881.
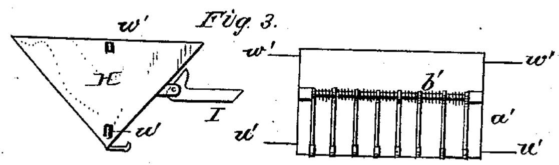
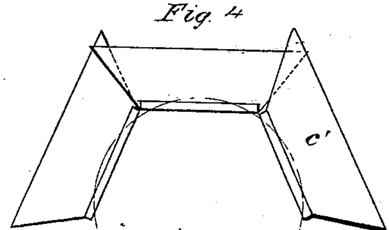
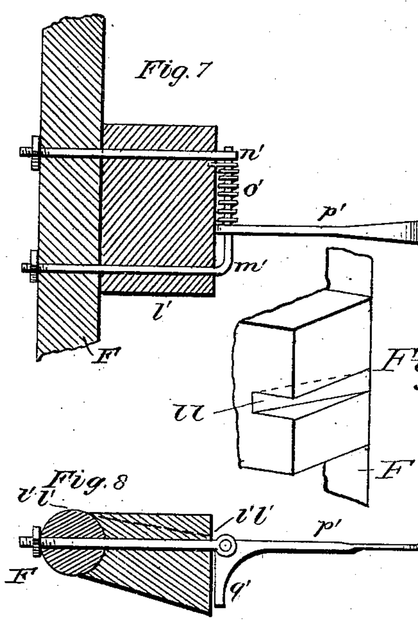
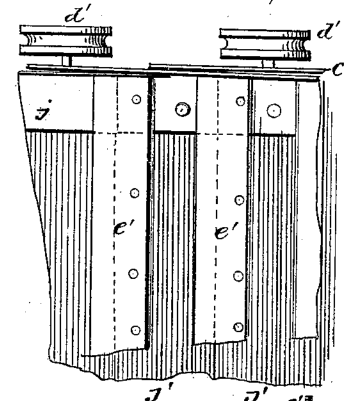
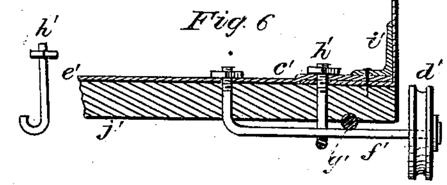
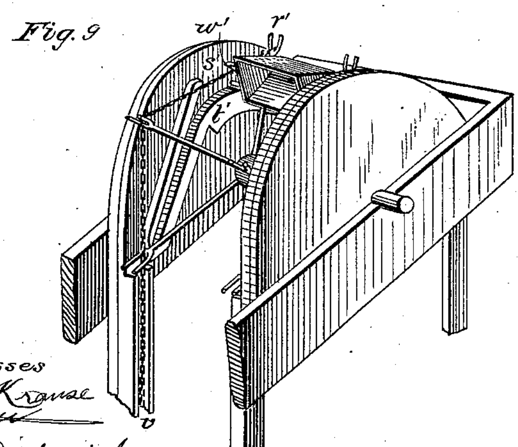
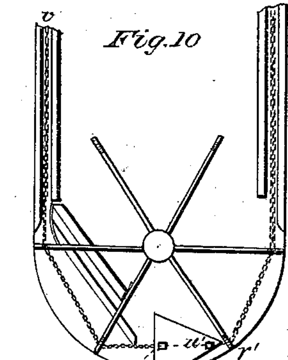
Witnesses
A. H. Krause
F. G. Dieterich
Inventor.
J. H. Schenck,
Sibney Maltby
N. PETERS. Photo-Lithographer, Washington, D. C.

(No Model.)

J. H. SCHENCK & S. MALTBY.

MACHINERY FOR EXCAVATING AND CONSTRUCTING SEWERS.

No. 247,783. Patented Oct. 4, 1881.

Witnesses:
Fred. G. Dieterich
A. H. Krause

Inventor:
J. H. Schenck.
Sidney Maltby

N. PETERS. Photo-Lithographer, Washington, D. C.

UNITED STATES PATENT OFFICE.

JOHN H. SCHENCK, OF NEW YORK, N. Y., AND SIDNEY MALTBY, OF WASHINGTON, DISTRICT OF COLUMBIA; SAID MALTBY ASSIGNOR TO SAID SCHENCK.

MACHINERY FOR EXCAVATING AND CONSTRUCTING SEWERS.

SPECIFICATION forming part of Letters Patent No. 247,783, dated October 4, 1881.

Application filed December 27, 1880. (No model.)

*To all whom it may concern:*

Be it known that we, J. H. SCHENCK, a citizen of the United States, residing in the city, county, and State of New York, and SIDNEY MALTBY, resident of Washington, District of Columbia, have invented a new and useful Improvement in Machinery for the Excavation and Construction of Sewers, of which the following is a specification.

This invention relates to improved mechanism combined in a portable machine for the construction of sewers, in which the soil is picked, sliced, scooped, elevated, conveyed to the rear, and dumped on the completed work, the entire process being automatic and continuous in its operation; and the objects of these improvements are, first, to provide a series of automatic pickers in closer proximity and more effective operation than the ordinary pickax; second, a series of knives slicing the soil, but yielding to a rigid obstacle; third, a continuous line of scoop-shaped buckets, running in grooved tracks elevating to any height; fourth, a conveyer of peculiar construction delivering to the rear.

This invention consists, first, in the construction of a roadway corresponding to the curve of the cut to be made, which not only serves as a roadway for the machine, but molds into form the soil underneath for the reception of the foundation material; second, in the combination, in an excavating-machine, of open teeth or lantern-geared tracks of varied lengths, curved or straight, with their traveling pinions of different diameters, whereby with the same revolutions varied distances are traveled for the purpose of cutting the bank to a slope, when desired, substantially as described; third, in the combination, with the tracks and pinions as described, of the adjustably sliding bearings, by which the varying distances of these bearings are compensated for and made to adjust themselves to the traveling shafts when working on either side of a central vertical line; fourth, in the combination, with the traveling shafts, tracks, and pinions, as described, of the vertical slotted shaft *i*, the vertically-adjustable sliding bearings with their connecting-pinions on said traveling shafts for driving said traveling shafts, as shown; fifth, in an excavating-machine, the horizontal square or slotted shaft *c*, the sliding pinion and sleeve *h''*, (shown by Figure 14,) the traveling shafts *n n o o p p*, the pick-shaft F, and the mechanism for elevating and conveying the picked soil to the rear of the work; sixth, in combination with the bifurcated device and its pivoted journal-bearings, the pick-shaft F and a pivoted pick, *p'*, provided with a stop or arm, Fig. 8, *q'*, operating as described; seventh, the combination of a pivoted pick, Fig. 7, provided with an arm or stop with the block *l'*, recessed for the reception of the said pick when not in use, the pick being held in position by a spring or similar device, the whole being adapted to an excavating-machine; eighth, the combination, in an excavating-machine, of a dirt-elevator provided with buckets sharpened on their edges, carried by an endless belt-chain, and arranged to suddenly tilt by means of differential ways, in the manner shown, as best seen in Fig. 9; ninth, in an elevator the upper end of the frame provided with differential tracks, the upper one having in its circumference an opening, by which the pivoted bucket is made to suddenly drop by its own gravity to a supplemental track, by which it more efficiently dumps its contents, and is then carried round to its downward vertical position; tenth, a continuous conveying apparatus composed of sections, each section being provided with side lapping ends projecting from the slat, whereby the material conveyed is retained upon the conveyer without coming in contact with the stationary sides, each of said slats being provided with a lapping apron strip, by which the material carried on the conveyer is prevented from falling through or between the slats; eleventh, in an endless apron or conveyer, the operating rope or chain secured to the slats or sections thereof by means of the hook-bolt, Fig. 6, and the axle *f'*, thereby holding each section separately on the endless rope. These objects are attained by means of the mechanism illustrated in the accompanying drawings, in which—

Fig. 1 is a front elevation of the machine. Fig. 2 is a perspective, with parts broken out;

Fig. 3, the slicing-knives; Fig. 4, the sheet-metal pieces on ends of slats forming sides of conveyer, as shown, in turning the drums; Fig. 5, strips protecting the crevices between these slats; Fig. 6, the pulley and fittings on end of slats. Fig. 7 is a section through the block and shaft taken lengthwise of the latter upon the line of the bolts securing the picks; Fig. 8, another view of the same; Fig. 9, upper drum of elevator, showing the drop and delivery of the bucket; Fig. 10, the lower drum of the same, showing the bucket scooping the dirt; Fig. 11, the track and bearings; Fig. 12, a longitudinal section of frame with worm-gear operating the travelers; Fig. 13, horizontal shaft with slide-bearings; Fig. 14, plan view of Fig. 13, with the upper shaft and gear omitted; Fig. 15, the bifurcated device for pick-shaft; Fig. 16, lantern-gearing used to drive the pick-shaft; Fig. 17, cross-section of conveyer D in Fig. 2.

In the construction of a large sewer, for which this is specially adapted, the bed of the cut often requires to be curved. To attain this, where so required, the curved bed is floored transversely with bent wood in sections, smooth underneath, and with ribs on the upper sides, affording a level bearing for the track-timbers on which the structure moves automatically. This flooring is in sections, and laid in advance within a space provided between the frame-work and elevator.

*k l m* are three pairs of tracks for the traveler-shafts, curved to correspond to the excavation desired. These tracks are of lantern-gear, the pins extending across between flat bars. The pinions traveling in these tracks are rigidly set on hollow horizontal shafts *n n o o p p*, themselves driven by worm-gear operating a pinion on each shaft. The worms are driven by a slotted vertical shaft, *i*, set in a frame, *h*. This allows the bearings, Fig. 12, *e''*, for each worm and pinion to slide in the vertical frame, for purposes shown hereinafter. A pinion, *j*, at the upper end of shaft *i* is driven by a worm on the horizontal shaft *g*, to reduce motion. The driving-power is communicated by means of belts *a* and *a* and bevel-gear *b* operating the end of the square or slotted shaft *c*, allowing a pivot motion at that end of the guide-bearing *d*, carrying with it the shaft *c''*. This shaft *c* extends transversely across the machine, the end opposite to the end pivoted being counterweighted and playing vertically in a slide. This shaft *c* carries a loose sleeve and bevel in a bearing, *e*, through which the shaft *c* passes. In this bearing *e* the corresponding bevel *i''* drives a pinion, *j*, on its shaft, which in turn drives an upper pinion, *g''*, Fig. 13. The latter pinion drives loosely a horizontal shaft, *p*, which is slotted for the purpose of allowing it to slide inwardly over and beyond the bearing *e*, containing the bevels *h''* and *i''*, already named. This is accomplished by rotating the ratchet *x''*, which moves the pawl and clutch *k'*, the clutch being held in position between the two collars *v''* on shaft *p*, thus sliding the latter in the sleeve *v'*. This bearing *e*, Fig. 13, slides transversely in one or more grooved guide-pieces, *d*, curved to correspond with the upper track, *k*. Through the three traveling hollow shafts (shown in solid black, Fig. 12, *n n o o p p*) pass three shafts. Upon the forward end of the middle, *o*, and lower, *n*, shafts the bifurcated bearings are attached to the shafts themselves, containing the journals for the pick-shaft F. The upper fork is held loosely on the hollow traveler-shaft *p p*, and the shaft passing through it drives the pick-shaft at the upper end, as elsewhere described.

By the foregoing arrangement of the square or slotted shaft *c*, so pivoted, the sliding bearing is allowed to rise and fall in the curve described by the transverse motion of the upper traveler-shaft *p*. The pick-shaft, being held in three bearings, is pivoted on the central one, and it may be inclined to any desired angle against the forward bank. It is fitted with a series of adjustable picks arranged spirally and fitted to the shaft, as shown in Figs. 7 and 8.

Fig. 15 shows the fork or bifurcated attachment to the end of the upper traveling shaft, *p p*, in the socket of which *p p* revolves.

Fig. 16 shows the lantern-gear *q* set on the end of the shaft *p* within the hollow shaft *p p*, driving the upper end of the pick-shaft F. The middle and lower forks are attached to the ends of the solid shafts passing through the hollow traveling shafts *n n o o p p*. In each of these forks is located a journal, pivoted in such manner that it may be adjusted to any angle, and in these journals the pick-shaft F works. In order to remove or replace these journals or the pick-shaft for any purpose it is only necessary to remove the side screws. When necessary to change the angle of the pick-shaft F in cutting the forward bank, the lower traveling shaft, *n*, may be thrown out or forward, and the upper one, *p*, thrown in or back, the center bearing forming a pivot, as shown by dotted lines G on Fig. 2. Upon the travelers is also set the frame of the elevator E, consisting of an endless belt or chain bearing a series of buckets, H, whose projecting arms run in grooves *v*, Figs. 9 and 10. These buckets scoop the loosened dirt at the bottom, (*vide* Fig. 10,) and by means of a device described in connection with Fig. 9 (referred to hereinafter) deliver it at the top in the center of the elevator-frame and upon the conveyer D.

The elevator is driven by means of a toothed pinion set on shaft *g* and operating both the upward and downward sides of the chains, or, as shown in Figs. 2 and 11^A^, by two pinions, *t*, driven by an intermediate pinion on shaft *g*. The chain or belt may be held against the driving-pinions by anti-friction rollers *u*, as shown in Fig. 1, right hand. The conveyer is driven by miter-gear taken off from the shaft *g*, a vertical shaft carrying a pulley, *q*, traversed by the continuous driving-cord *r*, passing pulleys on both drum-shafts $s$, one of which is shown in Fig. 2. The conveyer is pivoted upon bearings projecting upward from the rear end of the machine, as seen in Fig. 2 at C. The forward end of the conveyer may extend through the elevator-frame E as far as desired, (the bearings upon which the conveyer is pivoted being adjustable,) thereby shortening the point of delivery. The conveyer may be of any required length, and may be braced as desired, preferably as shown in Fig. 2.

Fig. 17 shows a cross-section through the center of the conveyer. In this figure is shown an upper and lower track, with wheels resting on each. It also shows the edge of apron-slats above and below. The object of having two tracks is that the lower track receives the wheels after leaving the drum, by which the usual sag of the apron is avoided, the weight of the apron being carried by its own wheels on the lower track.

It will be seen that the travelers are designed to carry the pick-shaft and elevator transversely across a wide cut. It is also essential to cut the banks on either side to a slope. To accomplish this the central traveling pinions, $o'$ $o'$, are larger than those $n'$ $n'$ on the lower shaft, $n$ $n$, and smaller than those $p'$ $p'$ on upper one, $p$ $p$, their revolutions remaining the same, so that the upper shaft, $p$ $p$, traverses the tracks either way at an increased ratio. As the traveling pinions $n$ $n$ $o$ $o$ $p$ $p$ recede from the center in either direction their varying distances are compensated for by the bearings sliding in the frame $h$, whereby they automatically adjust themselves to the varied location of the traveling pinions while traversing the track. The reason for making the pinions of variable sizes in this case is that, by means of a greater length of track above than below, the upper end of the pick-shaft and elevator is carried beyond the vertical line of the lower pinion, thus adjusting the picks to an incline, whereby either side bank is cut to a slope. Each of the traveling shafts is retained in position by means of a guide or bar, $g''$, above them having the same curve as the track. The pick-shaft and elevator, though vertical while at the center, (*vide* Fig. 1,) inclines toward either bank at a proper angle while on either side of the center, the pick-shaft being always inclined forward, cutting the head bank to any desired slope as a prevention against caving. This machine moves itself forward by means of winches B on either side, operating spars A extending to the rear. (See Fig. 2.) It also moves itself backward by spars extending forward, or by anchoring a line astern leading to a winch at the engine.

When in operation it is preferred to lay a curved floor with pieces forming a level bearing for the tracks, upon which the machine travels. This flooring serves the purpose of pressing the dirt into the exact mold or form to receive the concrete or other material constituting the formation for the sewer structure, as shown on Sheet 1, Fig. 11. The whole is operated by motive power placed below and as far forward as practicable.

Description of details, see Sheets 3 and 4.

Fig. 3 shows the arrangement of a series of slicing-knives affixed to a portion of the buckets. H, left side of Fig. 3, is an end view of a bucket, and a side view of the knives projecting beyond the line of the scooping-edge, and arranged to hook back when not required while operating in light soil. $a'$ is a right-hand-side view, in Fig. 3, of the series of knives, presenting them edgewise, pivoted on coil springs $b'$, thus held in position, but yielding to a rigid obstacle. In this view the knives are shown folded back.

Fig. 4 shows the metal side pieces, (passing the drums,) $c'$, mounted on either end of the slats forming the apron of the conveyer, the said side pieces, forming the side to the same, preventing the dirt from clogging against the sides of said conveyer.

Fig. 5 shows the apron-strips $e'$ covering the joints between the slats, as shown by dotted lines, also plan view of wheels $d'$ and of the metal ends lapping each other.

Figure 12:
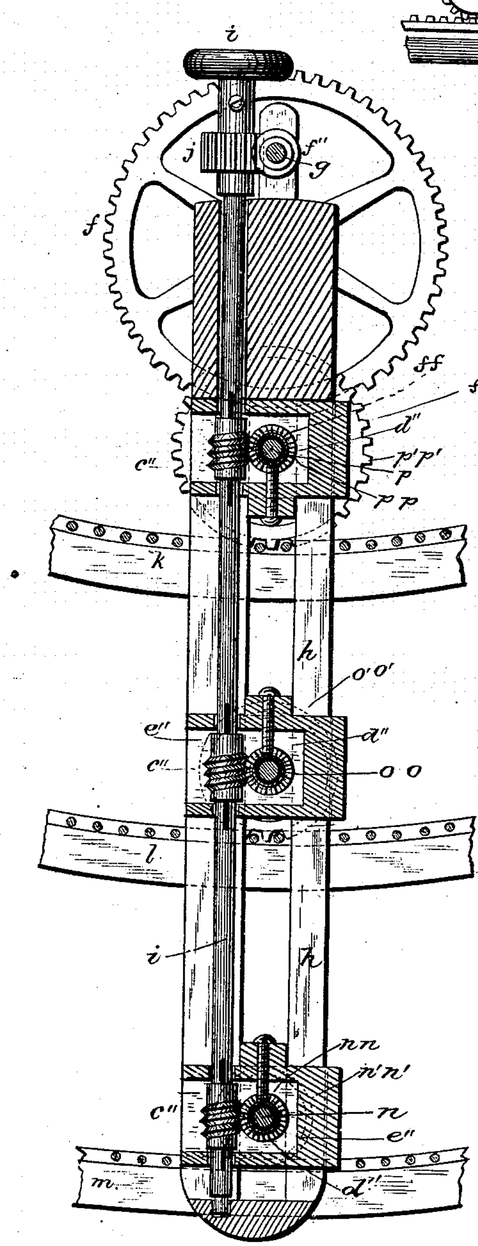

Fig. 6 shows a sectional view of a portion of a slat, $j'$, and of apron-strip $e'$, also of metal end $c'$, and of the angle-iron $i'$ to stiffen the same. $f'$ is the shaft and journal of the wheel bolted through the slat $j'$. $h'$ is a hook-bolt, the object of which is to retain in position the movable apron-slat upon the continuous wire rope or chain $g'$. It also holds in position the axle or shaft $f'$, and passing through the horizontal portion of metal end $c'$ holds them securely together and upon the slot $j'$. $h'$, left of Fig. 6, is a side view of said hook-bolt.

Fig. 7 is a bisected view of the pick-mounting. F is the shaft. $l'$ is a block through which the securing irons are bolted. The lower iron $m'$ is of L shape, its upper end passing through the eye of the upper or eyebolt $n'$. $o'$ is a coil-spring holding the pick $p'$ in position.

Fig. 8 is a plan view of Fig. 7. The pick at its pivoted end is provided with a shoulder, $q'$, at right angles thereto, which abuts against a bearing of the block, and is held against it by means of a coil-spring, $o'$. $l'$ $l'$ is a recess in said block, allowing the pick to fold back when in contact with an obstacle, or when not wanted to cut. Fig. 8^A is a perspective view, showing the recess to receive the pick when folded back.

Fig. 9 is a perspective view, showing side and top of elevator. The bucket or scoop is of V shape in cross-section, all the edges being sharp to more readily cut through the soil. It is provided with arms, projecting at either end above and below, as shown in Fig. 3, $u'$ $u'$, the lower arms being attached to the chain. The upper arm of the bucket, in this instance, is represented as having suddenly dropped through an opening in the apex of the upper track, $s'$, of the differential ways provided for the purpose, and, striking the lower or supplemental portion of the said ways, the bucket is tilted, and the jar of the drop greatly aids the dumping of the contents across the shaft of the drum. The arm of the drum-shaft $r'$ carries the lower bucket-arm $u'$ across the opening of the upper track or way, $s'$, down the upper sides of which it passes, while the upper bucket-arm passes down the lower track, $t'$, and both pass into the vertical grooves $v$ in their downward passage.

Fig. 10 is the lower drum of elevator. The bucket is pivoted by its arm $u'$, located at the rear angle thereof, upon the chain in such manner as always to be taken and supported at the end of an arm of the drum $r'$ which carries the chain. The upper arm of the bucket $w'$ rests upon the inner side of the chain. The vertical grooves $v$ may extend down the circle as far as necessary to receive the upper arm of the bucket.

Fig. 11 shows the curved flooring underneath the machine for molding the soil into form. In this view, $x'$ are the flooring-pieces; $y'$, the ribs attached to the same; $z'$, track-pieces resting on the ribs; $a''$ the lateral braces holding the tracks in position; $b''$ wheels flanged over the tracks bearing the machine. Fig. 11B is a side view, showing the jointing arrangement of the sections of the curved floor and their ribs. $x'$ shows the end wood of the flooring; $y'$, the ribs, the ends projecting at the joints of the flooring, as shown at $w''$.

Fig. 12 is a vertical section of the frame carrying the vertical rotating shaft which operates the three traveling shafts. $i$ is the vertical slotted shaft; $c''$, the three worms set loosely upon it; $d''$, the corresponding pinions operated by it on the traveling shafts $n\ n\ o\ p\ p$. $e''$, in dotted lines, shows the traveling pinions on the middle and lower curved tracks. $f\ f$ is a corresponding pinion, in heavy lines, on the upper track. $j$ is a pinion at top of shaft $i$, by which it receives motion. $f''$ is the worm on horizontal shaft $g$ driving $j$; $f$, large pinion whose shaft operates the elevator and conveyer, as shown in Fig. 2.

Figure 13:
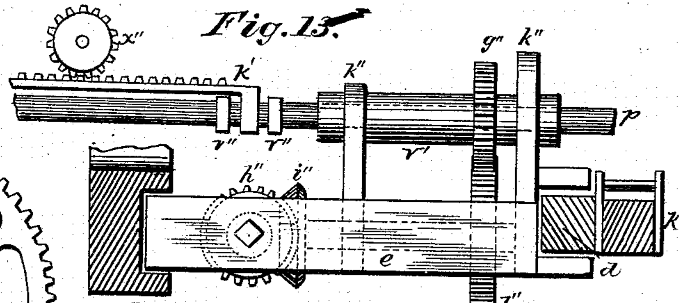
Figure 14:
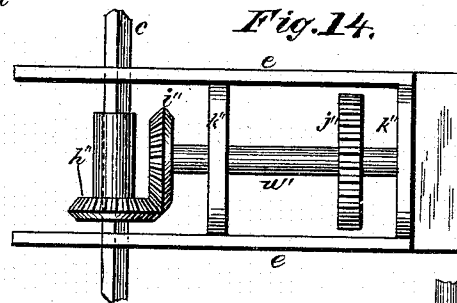

Figs. 13 and 14 show the sliding bearing with another arrangement for communicating power through a counter-shaft, $u''$, pinion $j''$, and intermediate pinion, $g''$, to large pinion $f$, thereby allowing shaft $p$ to slide in and past the horizontal square or slotted shaft $c$. $e$ is end view of bearing with opening for shaft $c$; $d$, end view of guide pieces for $c$; $h''$, miter-wheel with its sleeve on $c$. $i''$ is an edge view of the corresponding miter on the short shaft $u''$, (shown in Fig. 14,) carrying pinion $j''$. The latter drives pinion $g''$ above on shaft $p$, Fig. 13. The latter is slotted at this end and runs through a sleeve, $v'$, and its bearings $k''$, and $k''$ extending upward from the bearing $e$. This holds the pinions $j''$ and $g''$ and shafts in their proper relative position.

Fig. 14 is a plan view of the lower portion of Fig. 13, $h''$ being the miter and sleeve on shaft $c$ driving $i''$.

Figures 15, 16:
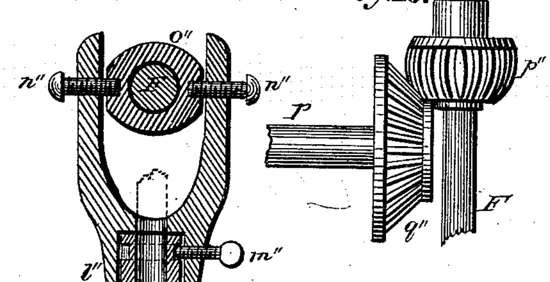

Fig. 15 shows a horizontal cross-section of the upper bifurcated bearing, serving as a hanger for the pick-shaft F. $p\ p$ is the traveling shaft, which, by means of a groove, revolves in $l''$, which is the socket of the forked hanger, and through it a screw-pin, $m''$, enters the groove in $p\ p$, holding them in their relative position while the said hollow shaft $p\ p$ revolves in traveling. $n''$ are the screw-pins through the points of the fork, on which the journal $o''$ is pivoted. In this plays the pick-shaft F, resting on a shoulder on which it constantly bears, though it will be observed that when the pick-shaft F is inclined to a different angle, as shown by dotted lines G in Fig. 2, F plays vertically in the middle and lower journals.

Fig. 16 shows a side view of the lantern-gear driving the pick-shaft within the bifurcated bearing or hanger shown in Fig. 15. $p''$ is a pinion on pick-shaft F. The teeth have a convex surface, enabling it to drive at varied angles. $q''$ is a corresponding lantern-gear, whose pins work readily in the the teeth of $p''$ at a moderately varied angle. This lantern-gear $q''$ is set rigidly upon the shaft $p$, extending through the upper traveling shaft, $p\ p$.

Figure 17:
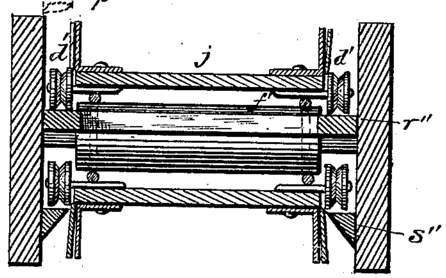

Fig. 17 is a cross-section of the conveyer, showing the position of the apron-slats and pulleys upon the tracks. The larger portions are similarly represented in Fig. 6. $r''$ is the upper, and $s''$ the lower, track on which the return of the apron rests.

The operation of the continuous excavating and discharging machine is as follows: Being properly mounted in the cut, the machine moves itself forward a few inches each time the pick-shaft starts from one bank in its trip across to the other. As the picks, in cutting the face of the bank, are necessarily raised and lowered in describing the curve of the traveler's tracks, every portion of the face of the bank is reached by the picks, and the dirt falling to the bottom is taken up by the buckets and discharged upon the conveyer. When the soil is tenacious the splicing-knives I, attached to the buckets, are released from their catches, and serve to loosen the picked soil, when it is more readily taken up by the buckets. The dirt is deposited in the conveyer, and distributed evenly, when desired, at the rear, across the entire width of the cut, the rear end of the conveyer traversing the same space as the forward end, or it may be dumped into cars or conveyances to be carried off.

Having thus described this invention, what we claim, and desire to secure by Letters Patent of the United States, is—

1. The roadway, substantially as described—that is to say, of a curved form, to correspond with the bed of the cut to be made, and without projections on its under side, and in sections, each section being provided with jointing pieces adapted to receive each adjoining section, and the guides or rails upon which the machine moves itself, for the purpose set forth.

2. The combination, in an excavating-machine, of racked tracks of varied lengths, curved or straight, with their traveling pinions of different diameters, whereby, with the same revolutions, varied distances are traveled for the purpose of cutting the bank to a slope, when desired, substantially as described.

3. In combination with the tracks and pinions, as described, the adjustably-sliding bearings, by which the varying distances of these bearings are compensated for and the bearings made to adjust themselves to the traveling shafts when working on either side of a central vertical line.

4. In combination with the traveling shafts, tracks, and pinions, as described, the vertical slotted shaft *i*, the vertically-adjustable sliding bearings for the worms and pinions, the latter on the traveling shafts for driving the same, the said worms being driven upon one shaft and each worm driving a pinion upon one of the traveling shafts, thus connecting the whole, as described.

5. In an excavating-machine, the horizontal square or slotted shaft *c*, the sliding sleeve and pinion $h''$, (shown by Fig. 14,) the traveling shafts *n n o o p p*, the pick-shaft F, and the mechanism for elevating and conveying the picked soil to the rear of the work, as described.

6. In an excavator, an elevator-frame having ways or guides along its sides, and a continuous inner and broken outer guide at its upper end, combined with a chain of buckets having projecting bearing-arms, the rear arms of the bucket being secured to the chains, and the forward arms being free inside the chains and arranged to fall from the broken guide to the continuous guide at the top of the elevator, as and for the purpose set forth.

7. In combination with the bifurcated device and its pivoted journal-bearings, the pick-shaft F, and a pivoted pick, Fig. 8, $p'$, provided with a stop or arm, $q'$, operating as described.

8. The combination of a pivoted pick, provided with an arm or stop, with the block $l'$, recessed, as at $l'$ $l'$, for the reception of the said pick when not in use, the pick being held in position by a spring or similar device, the whole being adapted to an excavating-machine, as herewith set forth.

9. The combination, in an excavating-machine, of a dirt-elevator provided with buckets sharpened on their edges, carried by an endless belt or chain, and arranged to suddenly tilt by means of differential ways, in the manner shown, as best seen in $r'$ $s'$ $t'$, Fig. 9, substantially as described.

10. In an elevator, the upper end of the frame provided with differential tracks or ways, the upper one having an opening by which the pivoted bucket is made to suddenly drop by its own gravity to a supplemental track, by which it more efficiently dumps its contents, and is then carried round to its downward vertical position, as shown and described.

11. A continuous conveying apparatus composed of sections, each section being provided with side lapping ends projecting from the slats, whereby the material conveyed is retained upon the conveyer without coming in contact with the stationary sides, each of said slats being provided with a lapping apron-strip, by which the material carried on the conveyer is prevented from falling through or between the slats, as described and shown.

12. In an endless apron or conveyer, the operating rope or chain secured to the slats or sections thereof by means of the hook-bolt $h'$ and the axle $f'$, thereby holding each section separately on the endless rope, in the manner shown.

13. A scoop or bucket for elevating soil provided with a series of knives arranged to cut and loosen the picked dirt, whereby it may be more readily scooped, said knives being provided with springs, by means of which they are made to yield when coming in contact with rigid obstacles, or closed back out of the way when not in use, substantially as shown and described.

14. The pivoted pick constructed with an arm at right angles thereto to form a bearing, as an article of manufacture, substantially as shown and described.

J. H. SCHENCK.
SIDNEY MALTBY.

In presence of—
B. H. WEBB,
WATKIN WAKEFIELD.